2,900,431

METHOD FOR MANUFACTURE OF DRY-CHARGED BATTERY PLATES

Joseph A. Orsino, Mountain Lakes, N.J., assignor to National Lead Company, New York, N.Y., a corporation of New Jersey No Drawing. Application October 18, 1956
Serial No. 616,613

5 Claims. (Cl. 136—27)

This invention relates to the production of lead-acid storage batteries. In particular, this invention relates to the production of negative plates for dry-charged lead-acid storage batteries.

The most vexing problem in the manufacture of dry-charged storage batteries has been the production of an acceptable negative plate containing metallic sponge lead in a substantially unoxidized—i.e. charged—condition. All attempts to date have proceeded along the lines of preparing a pasted plate by filling a grid with an active material paste of lead oxide and water or dilute sulfuric acid, electrochemically "forming" the pasted plate in a sulfuric acid electrolyte thereby reducing the lead oxide to metallic lead, and then drying the formed plate. Except for the drying step, the operation was carried out, therefore, in the conventional manner that has been developed for the production of ordinary non-dry-charged batteries.

Drying the formed negative plates was found to entail serious difficulties, because the sponge lead was in a highly active form, and showed a strong tendency to oxidize during the drying step. Since the 'charge' of the negative plate is its capacity to undergo electrolytic oxidation from metallic lead to lead sulfate, such oxidation during drying constituted a discharge of plate capacity, and to the extent that the negative plates were oxidized, the resulting battery was not in the "dry-charged" condition.

Numerous expedients were employed in the attempt to overcome the tendency of the negative plate to oxidize during drying. Among others, these included the use of inert atmospheres, drying in a bed of silica or the like to exclude air, coating the plate with sugar evaporated from a solution, etc. All of these methods involved cumbersome apparatus and expensive handling, or introduced possibilities of contamination by extraneous materials, or both. Among the most satisfactory and successful of the various methods tried has been that of inactivating the sponge lead by incorporating therein certain antioxidant materials which make it possible to dry the formed negative plates directly in air without serious oxidation. Even this method, however, suffers from certain disadvantages, such as the addition to raw material costs contributed by the relatively expensive antioxidant substances.

An object of this invention, therefore, is to provide an improved method for the production of negative plates for dry-charged storage batteries. Another object is to provide a method for the production of dry-charged negative plates which avoids the necessity of employing inert atmospheres or exclusion of air to prevent oxidation during drying. Still another object is to provide such a method, which in addition does not necessitate the use of antioxidant addition agents. A further object is to provide a method which avoids altogether the necessity of electroformation in acid and drying a moist, charged plate. Other objects and advantages will become apparent from the following more complete description and claims.

Broadly, this invention contemplates a method of preparing a negative plate for a dry-charged storage battery of the lead-acid type, which comprises the steps of providing a supporting structure, applying to said supporting structure a reactive compound of lead, and treating said reactive compound with a reducing gas, thereby reducing the lead content of said compound to metallic lead.

The supporting structure may be of any conventional type, such as a grid of metallic lead or an array of lead wires for support of pencil-type electrodes. In accordance with conventional practice, the supporting structure will preferably be an electrical conductor and serve also as part of the electrical connection between the active material of the plate and the battery terminal. The preferred material for the supporting structure is metallic lead, and especially preferred is antimonial (e.g. 6% Sb) lead. Pure or chemical lead may also be employed, but antimonial lead gives optimum battery operating characteristics and service life.

The reactive lead compound may be substantially any lead compound capable of being reduced to metallic lead by the action of a reducing gas at a temperature withstandable by the material of the supporting structure. When antimonial lead is used, the reduction temperature should not be above 245° C. When pure or chemical lead is employed, the temperature may be somewhat higher—in fact up to just below the melting point of pure lead. Preferably, the reactive lead compound is an oxide or mixture of oxides of lead, these being readily reducible and among the least expensive sources of lead, and having the additional advantage that they contain no anion or other residue which might be undesirable in the finished plate. For convenience in operation and in conformity with conventional practice, it is preferred to employ the reactive lead compound in the form of a paste, in a vehicle of water or dilute sulfuric acid.

The reducing gas may be any gas capable of reducing to metallic lead the reactive lead compound employed. The lead compound and the reducing gas are therefore mutually interdependent to some extent, the essential characteristic being that the reducing gas selected must be capable of reducing the metal the lead compound selected. Whether or not this essential characteristic obtains will in many cases be obvious to the skilled chemist. If not obvious, it can readily be determined by simple experimentation. The preferred reducing gases, for most lead compounds including the preferred oxides of lead, are carbon monoxide and hydrogen. Either of these reducing gases is capable of reducing lead oxides to metallic lead at temperatures below the maximum withstandable by 6% antimonial lead grids. Preferably, in order to hasten the reaction, the reduction is carried out under a moderately elevated pressure, for example about 215 pounds per square inch above atmospheric.

In order to illustrate in greater detail the specific manner of carrying out certain preferred embodiments of this invention, the following examples are presented:

*Example I*

A conventional battery grid made of 6% antimonial lead was pasted with a viscous paste of litharge and water and dried. The dried plate was placed in a pressure vessel. The air was swept out of the vessel with CO gas, and the vessel was then sealed off and filled with CO to a pressure of approximately 140 p.s.i.g. at 25° C. The portion of the vessel containing the plate was then heated to 240° C. and maintained at this temperature for 11 hours. The pressure was increased by the heating to approximately 215 p.s.i.g. The vessel was then allowed to cool down and was opened to the atmosphere. The plate was removed from the vessel and examined. The active material had been converted to a hard, uniform, porous, black mass, which upon analysis was found to consist essentially of lead and lead oxide, 81% of the lead being in the metallic state. This degree of reduction is well within the acceptable range for dry-charged battery plates.

*Example II*

A battery plate was prepared by impregnating an antimonial lead grid with a paste of litharge and water, dried, and placed in a pressure vessel. The vessel was swept free of air by filling and exhausting four times with hydrogen under 100 p.s.i.g. pressure. The vessel was then filled again with hydrogen and sealed, then heated to about 245° C. The pressure rose to approximately 215 p.s.i.g. as a result of the heating.

These conditions were maintained for 5½ hours, after which the vessel was cooled and the partially spent gas was exhausted to the atmosphere. The battery plate was removed and a sample of the reduced oxide was removed from the grid and analyzed. The sample was 90.6% metallic lead. The plate was fully acceptable as a dry-charged storage battery negative plate.

As indicated by the above examples, this invention provides a method for the preparation of dry-charged negative plates, which avoids the steps of electrochemical formation and subsequent drying, and consequently overcomes the tendency of the sponge lead to oxidize and lose charge during the drying. The process is simple and easily carried out, and is readily adaptable to large-scale operations.

The significance of this invention as avoiding the conventional electro chemical formation step is considerable, as it eliminates the need for a tedious, time-consuming and expensive operation. The formation operation has heretofore been considered necessary in order to produce an active material of the proper physical characteristics for battery service.

As to the nature of the active material in the plate, it has been pointed out that "The active materials must be as porous as is compatible with freedom from shedding, so that effective diffusion and low internal resistance may be obtained."—Arendt, "Storage Batteries," p. 26, D. Van Nostrand Co., Inc., New York, 1928.

As to the method and specific conditions and precautions that must be observed for successful formation, Arendt gives five pages of directions, starting on p. 47 of the work cited, while Vinal gives a seven or eight page discussion starting on p. 28. Vinal, "Storage Batteries," John Wiley & Sons, Inc., second ed., New York, 1930.

The time-consuming nature of the operation is well illustrated by Vinal: "Formation is seldom complete in a day and it usually occupies several days." Vinal, op. cit., p. 29.

Against the background of the above authoritative statements, it is possible to appreciate the magnitude of the improvement contributed by this invention, and the surprising nature of the fact that the totally different and far easier method of preparation herein described and claimed is successful in producing a negative active material having all the desirable characteristics of a well-formed negative made in the conventional way.

While this invention has been described with reference to certain preferred embodiments and by way of certain specific examples, these are illustrative only, and the invention is not to be limited except as set forth in the appended claims.

I claim:

1. A method of preparing a negative plate for a dry-charged storage battery of the lead-acid type, which comprises the steps of providing a supporting structure, applying to said supporting structure a reactive compound of lead, and at least partially reducing said reactive compound to metallic lead by treating the same with a reducing gas in the absence of liquid water.

2. A process according to claim 1, in which said reactive compound is an oxide of lead.

3. A process according to claim 1, in which said reducing gas is hydrogen.

4. A process according to claim 1, in which said reducing gas is carbon monoxide.

5. A method according to claim 1, in which said reduction is carried out under elevated gas pressure.

References Cited in the file of this patent

UNITED STATES PATENTS

| | | |
|---|---|---|
| 723,327 | Sperry | Mar. 24, 1903 |
| 1,156,686 | Howard | Oct. 12, 1915 |
| 1,228,551 | Grant | June 5, 1917 |
| 1,275,232 | Edison | Aug. 13, 1918 |
| 1,799,248 | Reinhardt | Apr. 7, 1931 |